United States Patent
Berstis

[19]

[11] Patent Number: 5,995,598
[45] Date of Patent: Nov. 30, 1999

[54] PHONE LINE LAN

[75] Inventor: Viktors Berstis, Austin, Tex.

[73] Assignee: International Business Machines Corporation, Armonk, N.Y.

[21] Appl. No.: 08/797,075

[22] Filed: Feb. 10, 1997

[51] Int. Cl.$^6$ .................................................. H04M 11/00
[52] U.S. Cl. ................................. 379/93.28; 379/93.08; 379/93.31
[58] Field of Search .......................... 379/93.28, 93.29, 379/93.31, 93.09, 93.11, 93.17, 93.25, 93.08, 93.01, 106.01, 106.03, 106.04, 106.08

[56] References Cited

U.S. PATENT DOCUMENTS

| | | | |
|---|---|---|---|
| 4,586,905 | 5/1986 | Groff | 434/307 |
| 4,866,758 | 9/1989 | Heinzelmann | 379/94 |
| 4,985,892 | 1/1991 | Camarata | 370/123 |
| 5,189,694 | 2/1993 | Garland | 379/106.03 |
| 5,202,916 | 4/1993 | Oliver | 379/106.04 |
| 5,361,259 | 11/1994 | Hunt et al. | 370/84 |
| 5,386,438 | 1/1995 | England | 375/121 |

OTHER PUBLICATIONS

"Wireless networks expand entertainment options," *Austin—American Statesman*, p. H6 (Jan. 12, 1997).

*Primary Examiner*—Stella Woo
*Attorney, Agent, or Firm*—David A. Mims, Jr.; Daniel E. Venglarik; Andrew J. Dillon

[57] ABSTRACT

Existing modems and phone lines are employed to allow two or more data processing systems to communicate. The data processing systems communicate utilizing weak signals on top of existing phone line voltage levels. The signals are sufficiently small so as not to be interpreted as a receiver being lifted off hook. The weak signals may automatically adapt to changes in the phone line voltage due to a receiver be lifted off hook or an incoming call being signaled. At a sufficiently high frequency, the data processing systems may communicate while the phone lines are being simultaneously employed for conversation.

20 Claims, 6 Drawing Sheets

PHONE LINE LAN

BACKGROUND OF THE INVENTION

1. Technical Field

The present invention relates in general to data processing systems and in particular to providing an improved method of allowing data processing systems to communicate. Still more particularly, the present invention relates to enabling data processing systems to communicate without requiring a network adapter and using an ordinary embedded phone line in conjunction with an existing modem.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. There is a need for low cost data processing systems which are simple to operate, allowing users without computer skills the opportunity to access the Internet. This need is being addressed, to some extent, by "WebTV" systems.

In designing a low cost, simple data processing system, however, it is necessary to presume that the target user is unsophisticated and/or inexperienced. Therefore the operation of the data processing system must be both simple and intuitive, requiring little or no technical sophistication on the part of the user. In this regard, it would be advantageous to provide users with a simple method for connecting data processing systems to share information or resources without the expense of dedicated wiring and special local area network (LAN) adapters.

Conventional data processing systems typically require dedicated LAN adapters and cabling. Establishing communications between two or more data processing systems requires a high degree of technical ability, since the LAN adapters must be installed and configured, cabling must be run within the distance tolerances of the LAN system employed, and the operating system software on each connected data processing system must be configured or augmented to establish the communications capabilities.

Users with several data processing systems may need to connect such data processing systems to share resources, including, for example, a printer. Data processing systems designed to access the Internet already have modems, but lack the LAN cards and dedicated cabling utilized by most modern network systems. Moreover, a user's residence or place of business is generally already wired for multiple phone connections using the same line. It would be desirable, therefore, to provide a simple system for communicating between data processing systems using existing modems and phone wiring. It would also be desirable to make such a system as simple to implement as possible, requiring no technical knowledge on the part of the user.

SUMMARY OF THE INVENTION

It is therefore one object of the present invention to provide an improved data processing system.

It is another object of the present invention to provide an improved method of allowing data processing systems to communicate.

It is yet another object of the present invention to provide a method and apparatus enabling data processing systems to communicate without requiring a network adapter and using an ordinary embedded phone line in conjunction with an existing modem.

The foregoing objects are achieved as is now described. Existing modems and phone lines are employed to allow two or more data processing systems to communicate. The data processing systems communicate utilizing weak signals on top of existing phone line voltage levels. The signals are sufficiently small so as not to be interpreted as a receiver being lifted off hook. The weak signals may automatically adapt to changes in the phone line voltage due to a receiver be lifted off hook or an incoming call being signaled. At a sufficiently high frequency, the data processing systems may communicate while the phone lines are being simultaneously employed for conversation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1A, 1D:
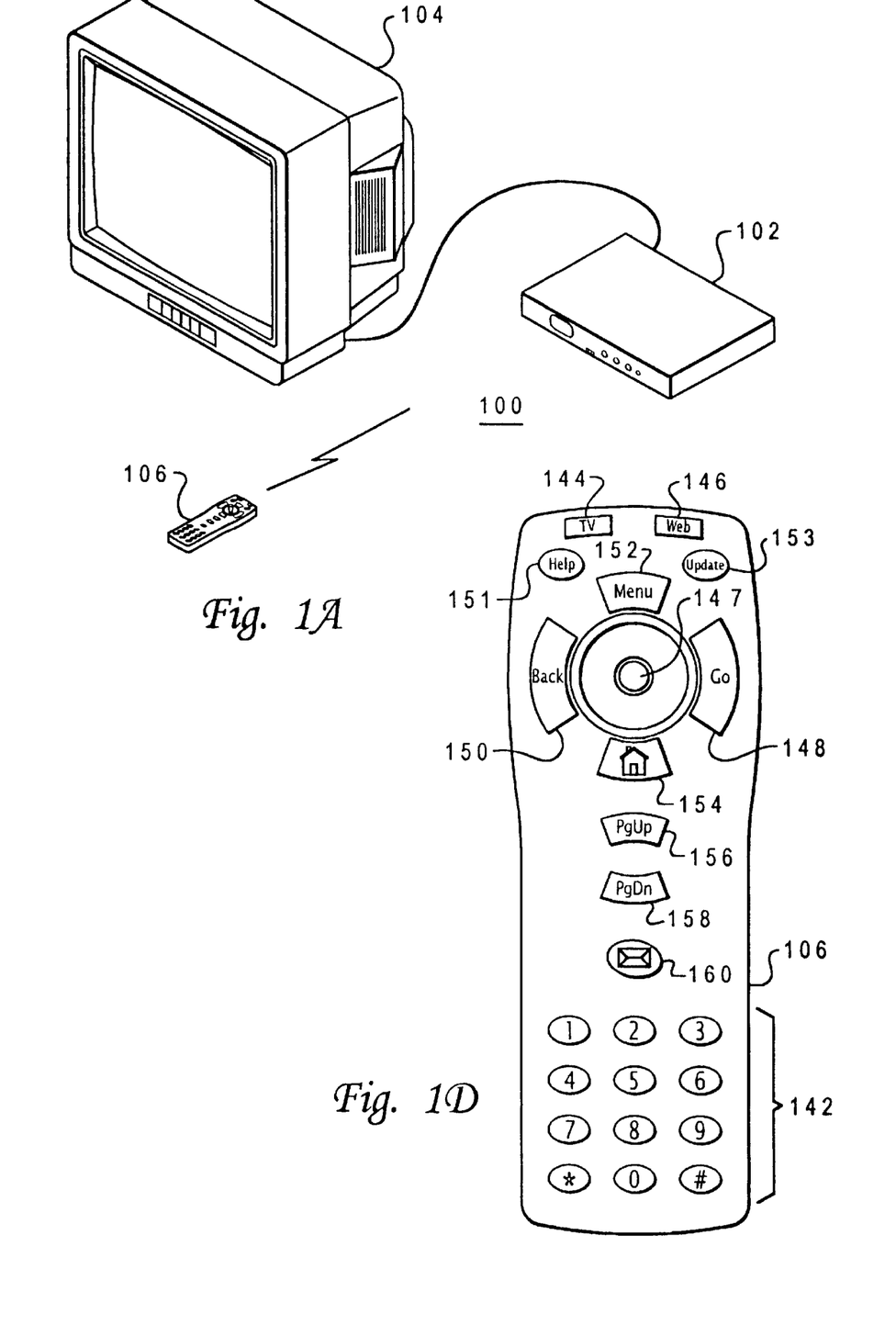
FIGS. 1A–1D depicts various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
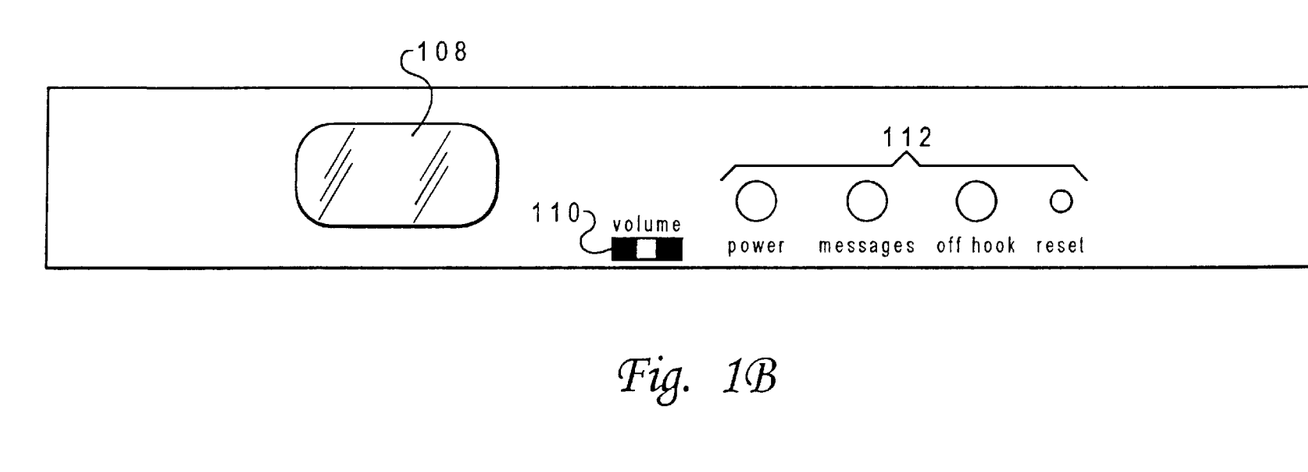

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
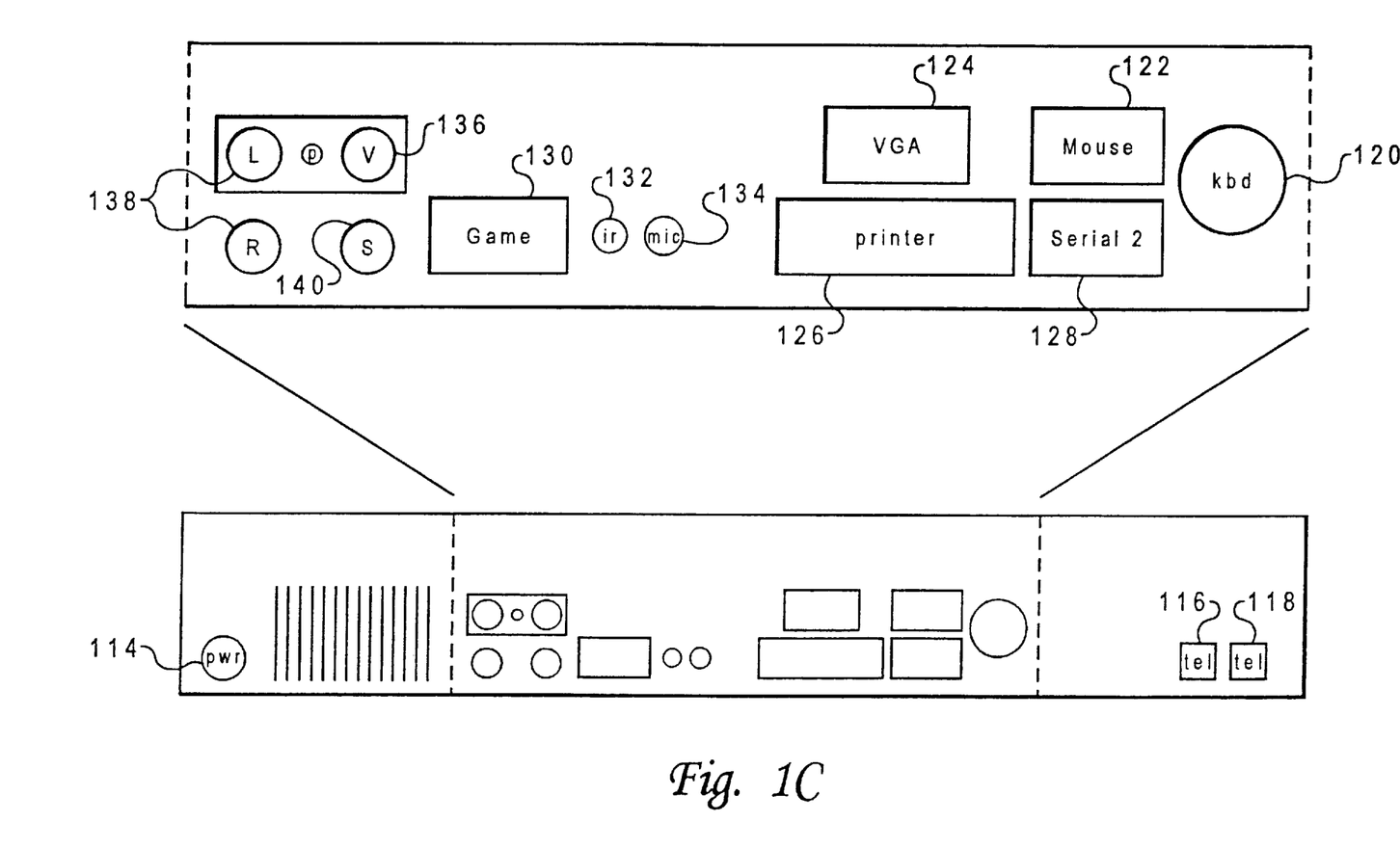

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
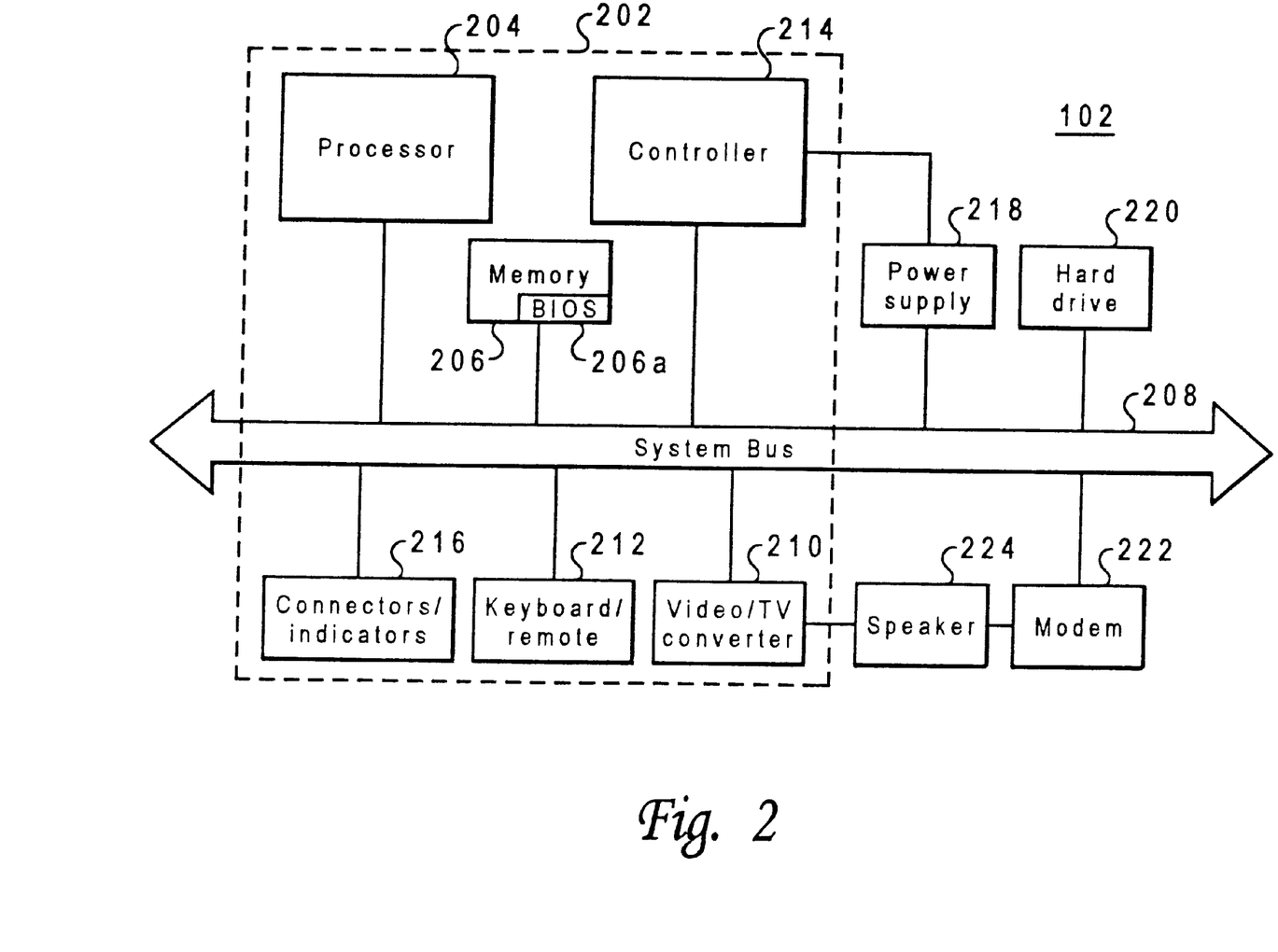
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805× family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3:
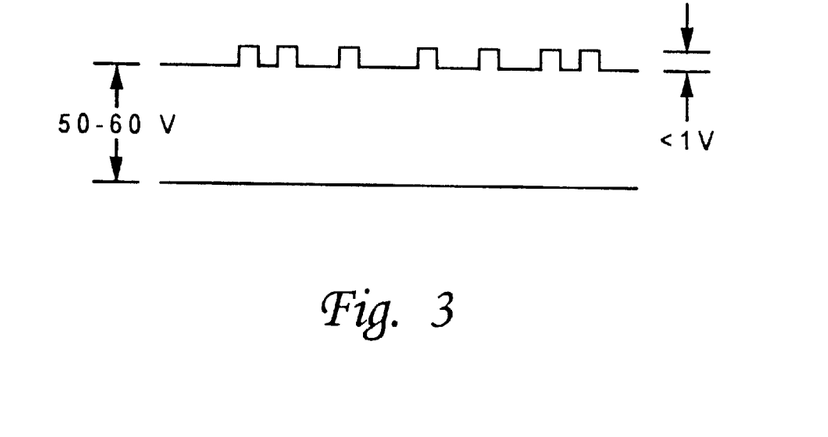
FIG. 3 depicts a diagram of the operational voltage levels of a phone line LAN in accordance with a preferred embodiment of the present invention.

With reference now to FIG. 3, a diagram of the operational voltage levels of a phone line LAN in accordance with a preferred embodiment of the present invention is depicted. Telephone lines are typically maintained at a differential direct current (DC) voltage level of 50–60 V. When a telephone receiver connected to the telephone lines is off-hook, the voltage difference drops 1–10 V. A telephone service provider senses this voltage drop and transmits a dial tone to the receiver. Existing phone lines may be employed, however, to transmit a low voltage signal on top of the on-hook phone line voltage. As long as the voltage levels employed are small enough not to be interpreted by the telephone service provider as a receiver being lifted off-hook, the existing phone wiring may be used to transmit signals between data processing systems. The signal distances required will typically be sufficiently small to allow such weak signals to serve as a means of communication.

In implementing the phone line LAN of the present invention, the existing modem is simply provided with the requisite hardware for transmitting 1 V signals or less on top of an existing voltage level. The hardware may be designed to automatically adjust to changes in the voltage level, so that data transmission may continue even when an attached receiver is lifted off-hook or an incoming call is received. The voltage differential in telephone lines is typically raised to a level of approximately 80 V by a telephone service provider signaling an incoming call. Since both the transmitting and receiving stations were experience the same voltage level changes approximately simultaneously, the communications circuits may automatically adapt to such changes with minimal loss of data transmission time.

The data signals for a phone-line LAN in accordance with the present invention may be modulated in any appropriate manner, including amplitude modulation, frequency modulation, or phase shift key modulation. However, the cheapest mechanism to implement would utilize simple digital signals. Existing LAN communications circuits may be readily modified to provide the necessary signaling and receiving resources.

An application supporting communications through the phone-line LAN of the present invention may also be generated through simple modifications of existing LAN software. An Ethernet-style communications protocol may be employed, such that signaling between all stations occurs on a single wire. When a collision is detected (i.e., a garbled transmission received due to multiple stations transmitting simultaneously), each transmitting station waits a random amount of time before attempting to retransmit.

Most audio communications transmitted over telephone lines occur in a frequency range below approximately 20 KHz. Therefore, if the signals employed in the phone-line LAN of the present invention are transmitted at a frequency of at least 40 KHz, the signals will be undetectable to the human ear. Communications between two data processing systems could continue, uninterrupted, while the telephone is in use. A high pass filter may be utilized to recover the data signals from the overall signal received.

Figure 4:
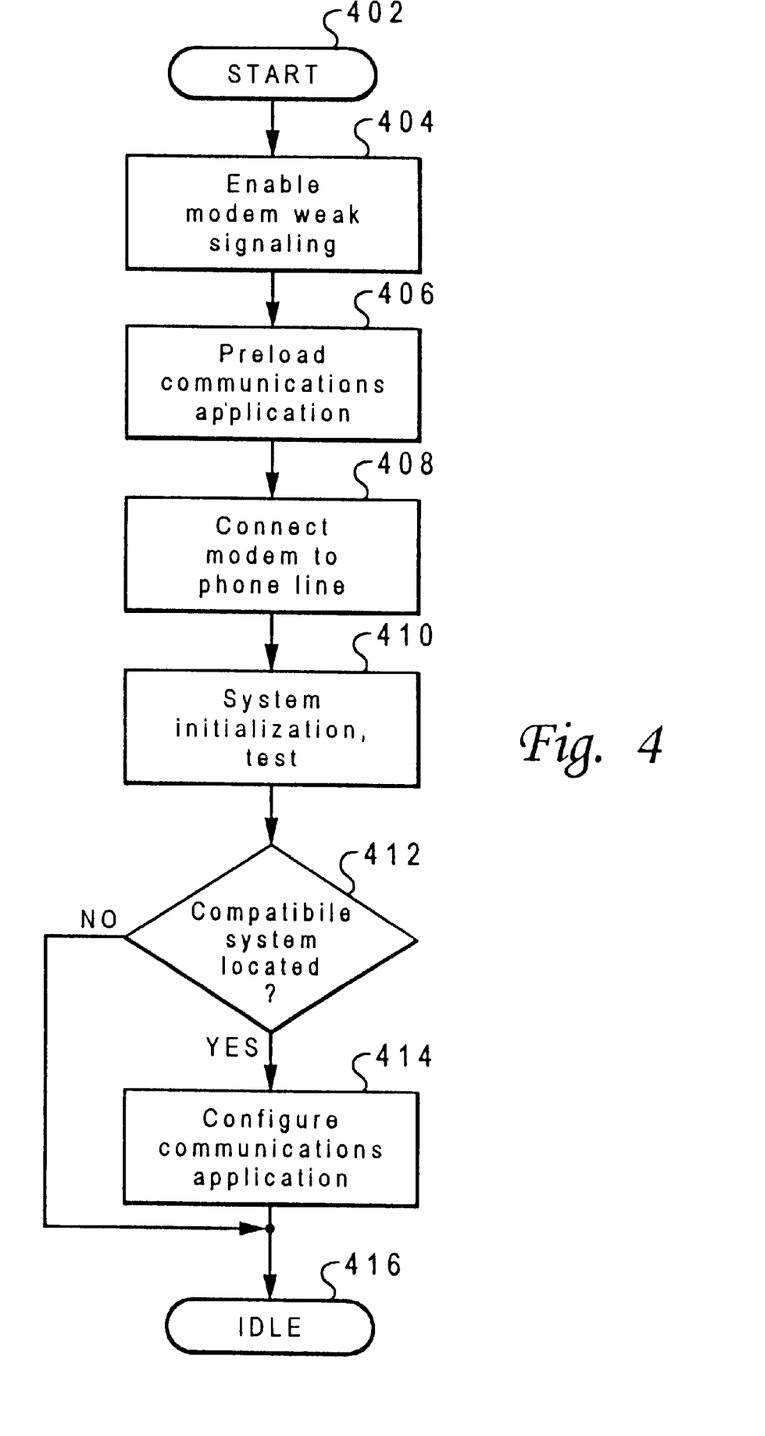
FIG. 4 is a high level flowchart for a process of providing a phone line LAN in accordance with a preferred embodiment of the present invention.

Referring to FIG. 4, a high level flowchart for a process of providing a phone line LAN in accordance with a preferred embodiment of the present invention is illustrated. The process begins at step 402 and passes to step 404, which depicts enabling the modem to transmit weak signals on top of an existing voltage differential as described above. The process then passes to step 406, which illustrates preloading the communications application onto the data processing system. Part of this communications application includes a mechanism for testing the phone lines during system initialization to determine whether a compatible data processing system is similarly connected to the phone lines. Steps 402–406 may be performed by the manufacturer of the data processing system.

The process then passes to step 408, which depicts a user connecting the phone line to the modem in the data processing system, and then to step 410, which illustrates system initialization. Connection of the modem to the phone line and system initialization need not occur sequentially in the order depicted. In fact, it may be preferable to initialize the system, then instruct the user to connect the phone line to the modem. Step 410 also depicts testing the phone lines to determine if other, compatible data processing systems are similarly connected to the same phone line. This test may be run each time the system is initialized to determine if a user has subsequently connected an additional compatible data processing system to the phone line.

The process then passes to step 412, which depicts a determination of whether one or more additional data processing systems are connected to the phone line. This determination may be made in two ways: First the telephone line may be tested during each system initialization by transmitting an identifying signal on the telephone line. The identifying signal is a signal to which a compatible data processing system is programmed to respond. The telephone line may then be monitored for an appropriate response during a defined timeout period. Alternatively, the telephone line may be monitored during the operation of the data processing system for transmission of an identifying signal by another data processing system. When such an identifying signal is detected, and appropriate response may be transmitted.

If compatible data processing systems are detected in step 412, the process proceeds to step 414, which illustrates configuring the communications application and establishing network capabilities with the other data processing system. The process then passes to step 416, which depicts the process becoming idle until the next system initialization, when steps 410–414 may be repeated. If other data processing systems are not detected on the phone line, the process passes instead directly to step 416.

Figure 5:
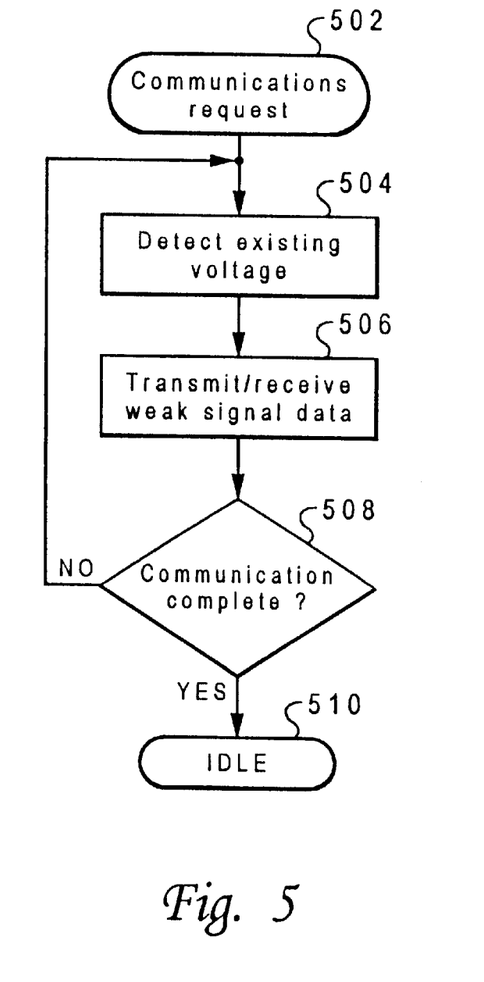
FIG. 5 depicts a high level flowchart for a process of employing a phone line LAN in accordance with a preferred embodiment of the present invention.

With reference now to FIG. 5, a high level flowchart for a process of employing a phone line LAN in accordance with a preferred embodiment of the present invention is illustrated. The process begins at step 502, which depicts receipt of a communications request, either from within the data processing system or from a different data processing system connected to the phone line LAN. The process then passes to step 504, which illustrates detection of the existing voltage level in the phone lines. The process then passes to step 506, which depicts transmitting or receiving data utilizing a weak voltage signal on top of the existing voltage level in the phone line, and then to step 508, which illustrates a determination of whether the requested communication is complete. If not, the process returns to step 504 and continues polling the existing voltage level and communicating through weak data signals on top of the existing voltage level. If the communication is complete, however, the process passes instead to step 510, which depicts the process becoming idle until the next communications request.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The present invention provides an inexpensive and simple method of connecting data processing systems using existing modems and phone lines. The communications mechanism for a particular data processing system is simple for the user to establish, requiring no more than connecting the modem to a phone line. The data processing system can then automatically configure itself upon detecting another, similar data processing system also connected to the phone line. Through this mechanism, a user may share information and resources between data processing systems without the expense and technical complications of LAN adapters and dedicated cabling.

While the invention has been particularly shown and described with reference to a preferred embodiment, it will be understood by those skilled in the art that various changes in form and detail may be made therein without departing from the spirit and scope of the invention.

What is claimed is:

1. A method of enabling a data processing system to communicate with a second data processing system, comprising:

connecting a modem in the data processing system to a telephone conductor;

detecting an existing voltage in the telephone conductor indicating that no communications device connected to the telephone conductor is off-hook; and configuring the modem to transmit and receive signals on the telephone conductor by adding the signals to the existing voltage, the signals comprising a maximum voltage level which is below a predetermined threshold less than or equal to a difference between the existing voltage and a voltage indicating that a communications device connected to the telephone conductor is off-hook.

2. The method of claim 1, wherein:

the step of connecting a modem in the data processing system to a telephone conductor further comprises connecting the modem to a telephone conductor coupling a local exchange to at least one wireline communications device;

the step of detecting an existing voltage further comprises detecting an existing voltage from about 50 to about 60 volts; and the step of configuring the modem to transmit and receive signals further comprises configuring the modem to transmit and receive signals comprising a maximum voltage level which is below a predetermined threshold of 1 volt.

3. The method of claim 1, further comprising:

preloading a communications application in the data processing system;

configuring the data processing system to transmit an identifying signal over telephone conductor at each initialization of the data processing system;

configuring the modem to monitor the telephone conductor for a response to the identifying signal; and configuring the modem, responsive to detecting a response to the identifying signal, to initiate configuration of the communications application.

4. The method of claim 1, further comprising:

preloading a communications application in the data processing system;

configuring the modem to monitor the telephone conductor for an identifying signal; and configuring the modem, responsive to detecting the identifying signal, to transmit a response on the telephone conductor and to initiate configuration of the communications application.

5. An apparatus for enabling a data processing system to communicate with a second data processing system, comprising:

connection means for connecting a modem in the data processing system to a telephone conductor;

detection means for detecting an existing voltage in the telephone conductor indicating that no communications device connected to the telephone conductor is off-hook; and configuration means for configuring the modem to transmit and receive signals on the telephone conductor by adding the signals to the existing voltage, the signals comprising a maximum voltage level which is below a predetermined threshold less than or equal to a difference between the existing voltage and a voltage indicating that a communications device connected to the telephone conductor is off-hook.

6. The apparatus of claim 5, wherein the connection means further comprises means for connecting the modem to a telephone conductor coupling a local exchange to at least one wireline communications device;

the detection means further comprises means for detecting an existing voltage from about 50 to about 60 volts; and the configuration means further comprises means for configuring the modem to transmit and receive signals comprising a maximum voltage level which is below a predetermined threshold of 1 volt, the configuration means maintaining a voltage within the telephone conductor above a threshold voltage interpreted by the local exchange as a communications device being lifted off-hook.

7. The apparatus of claim 5, further comprising:

means for storing a communications application in the data processing system;

second configuration means for configuring the data processing system to transmit an identifying signal over telephone conductor at each initialization of the data processing system;

third configuration means for configuring the modem to monitor the telephone conductor for a response to the identifying signal; and fourth configuration means for configuring the modem, responsive to detecting a response to the identifying signal, to initiate configuration of the communications application.

8. The apparatus of claim 5, further comprising:

means for storing a communications application in the data processing system;

second configuration means for configuring the modem to monitor the telephone conductor for an identifying signal; and third configuration means for configuring the modem, responsive to detecting the identifying signal, to transmit a response on the telephone conductor and to initiate configuration of the communications application.

9. A method, in a data processing system, of communicating with a second data processing system, comprising:

connecting a modem in the data processing system to a telephone conductor;

detecting an existing voltage in the telephone conductor; and transmitting and receiving signals on the telephone conductor by adding the signals to the existing voltage, the signals comprising a maximum voltage level which is below a predetermined threshold less than or equal to a difference between the existing voltage and a voltage indicating that a communications device connected to the telephone conductor is off-hook.

10. The method of claim 9, further comprising:

transmitting and receiving signals on the telephone conductor, the signals comprising a maximum voltage level less than 1 volt, the signals transmitted and received by adding the signals to the existing voltage of from about 50 to about 60 volts.

11. The method of claim 9, further comprising:

detecting changes in the existing voltage; and transmitting and receiving signals on the telephone conductor by adding the signals to a current voltage in the telephone conductor.

12. An apparatus, in a data processing system, for communicating with a second data processing system, comprising:

connection means for connecting a modem in the data processing system to a telephone conductor coupling a local exchange to at least one communications device;

detection means for detecting an existing voltage in the telephone conductor indicating that no communications device connected to the telephone conductor is off-hook; and signaling means for transmitting and receiving signals on the telephone conductor by adding the signals to the existing voltage, the signals comprising a maximum voltage level which is below a predetermined threshold less than or equal to a difference between the existing voltage and a voltage indicating that a communications device connected to the telephone conductor is off-hook.

13. The apparatus of claim 12, wherein:

the detection means further comprises means for detecting an existing voltage of from about 50 to about 60 volts; and the signaling means further comprises means for transmitting and receiving signals on the telephone conductor comprising a maximum voltage level of less than 1 volt without allowing a total voltage within the telephone conductor to drop below a threshold voltage interpreted by the local exchange as a communications device being lifted off-hook.

14. The apparatus of claim 12, further comprising:

second detection means for detecting changes in the existing voltage; and signaling means for transmitting and receiving signals on the telephone conductor by adding the signals to a current voltage in the telephone conductor.

15. A communications adapter for a data processing system, comprising:

a modem insertable into the data processing system, the modem, when inserted into the data processing system and connected to a telephone conductor coupled to a local exchange:

detecting an existing voltage in the telephone conductor indicating that no communications device connected to the telephone conductor is off-hook; and selectively transmitting and receiving signals on the telephone conductor by adding the signals to the existing voltage without allowing a total voltage within the telephone conductor to drop below a threshold voltage interpreted by the local exchange as a communications device being lifted off-hook, the signals comprising a maximum voltage level which is below a predetermined threshold.

16. The communications adapter of claim 15, wherein the signals comprise signals at a frequency higher than 40 MHz.

17. A computer program product for use with a data processing system, comprising:

a computer usable medium;

first instructions on the computer usable medium for connecting a modem in the data processing system to a telephone conductor coupled to a local exchange;

second instructions on the computer usable medium for detecting an existing voltage in the telephone conductor indicating that no communications device connected to the telephone conductor is off-hook; and third instructions on the computer usable medium for transmitting and receiving signals on the telephone conductor, the signals comprising a maximum voltage level which is below a predetermined threshold, the signals transmitted and received by adding the signals to the existing voltage without allowing a total voltage within the telephone conductor to drop below a threshold voltage interpreted by the local exchange as a communications device being lifted off-hook, wherein the data processing system is equipped to communicate over existing telephone lines.

18. The computer program product of claim 17, wherein the computer computer usable medium is a hard disk drive.

19. The computer program product of claim 17, wherein the computer computer usable medium is a floppy disk.

20. The computer program product of claim 17, wherein the computer computer usable medium is a CD-ROM.

* * * * *